United States Patent
Scranton, Jr.

(10) Patent No.: US 6,379,429 B1
(45) Date of Patent: Apr. 30, 2002

(54) DEVICE FOR FILTERING GASES

(76) Inventor: Delbert C. Scranton, Jr., 14596 Whittington Ct., Chesterfiled, MO (US) 63017

( * ) Notice: Subject to any disclaimer, the term of this patent is extended or adjusted under 35 U.S.C. 154(b) by 17 days.

(21) Appl. No.: 09/639,186

(22) Filed: Aug. 15, 2000

(51) Int. Cl.$^7$ .............................................. B01D 53/04
(52) U.S. Cl. ............................. 95/90; 95/143; 95/273; 96/108; 96/135; 96/147
(58) Field of Search .......................... 95/90, 141, 143, 95/273, 274; 96/108, 131, 132, 134, 135, 147; 55/385.1, 502, 507, 509

(56) References Cited

U.S. PATENT DOCUMENTS

| | | | |
|---|---|---|---|
| 154,645 A | * 9/1874 | Chase | 96/131 X |
| 810,733 A | * 1/1906 | Evans | 96/131 X |
| 2,284,147 A | * 5/1942 | Herrick | 96/147 X |
| 3,377,784 A | * 4/1968 | Walker | 55/385.1 |
| 3,475,885 A | * 11/1969 | Kline | 96/147 |
| 3,638,402 A | * 2/1972 | Thomas | 55/507 X |
| 3,744,976 A | * 7/1973 | Tongue | 96/134 X |
| 4,026,688 A | * 5/1977 | Patterson | 55/385.1 X |
| 4,057,406 A | * 11/1977 | Jansson | 55/385.1 |
| 4,350,502 A | * 9/1982 | Spatola | 96/108 X |
| 4,586,941 A | 5/1986 | Cooley | 55/385 |
| 5,316,569 A | * 5/1994 | Heunermund | 96/134 |
| 5,482,536 A | * 1/1996 | Ngai et al. | 96/147 X |
| 5,683,499 A | * 11/1997 | Kiyani | 96/147 |
| 5,846,274 A | 12/1998 | Smelser | 55/381 |
| 5,925,241 A | * 7/1999 | Aldridge et al. | 96/147 X |
| 5,966,876 A | 10/1999 | Neathery et al. | 52/20 |
| 6,068,681 A | * 5/2000 | Bourguignon | 96/108 X |
| 6,146,435 A | * 11/2000 | Stork | 96/147 X |

FOREIGN PATENT DOCUMENTS

| | | | | |
|---|---|---|---|---|
| GB | 2269117 A | * 2/1994 | | 96/147 |
| JP | 56-150417 A | * 11/1981 | | 96/132 |

* cited by examiner

*Primary Examiner*—Robert H. Spitzer
(74) *Attorney, Agent, or Firm*—Polsinelli Shalton & Welte P.C.

(57) ABSTRACT

The present invention relates to a device for use in a manhole or similar structure, whereby the device is designed to filter contaminate gas typically found in such structure. More particularly, the device includes a canister member filled with filtration media, a skirt member designed to direct contaminate gases towards the canister, and a support member for holding the canister in place.

9 Claims, 3 Drawing Sheets

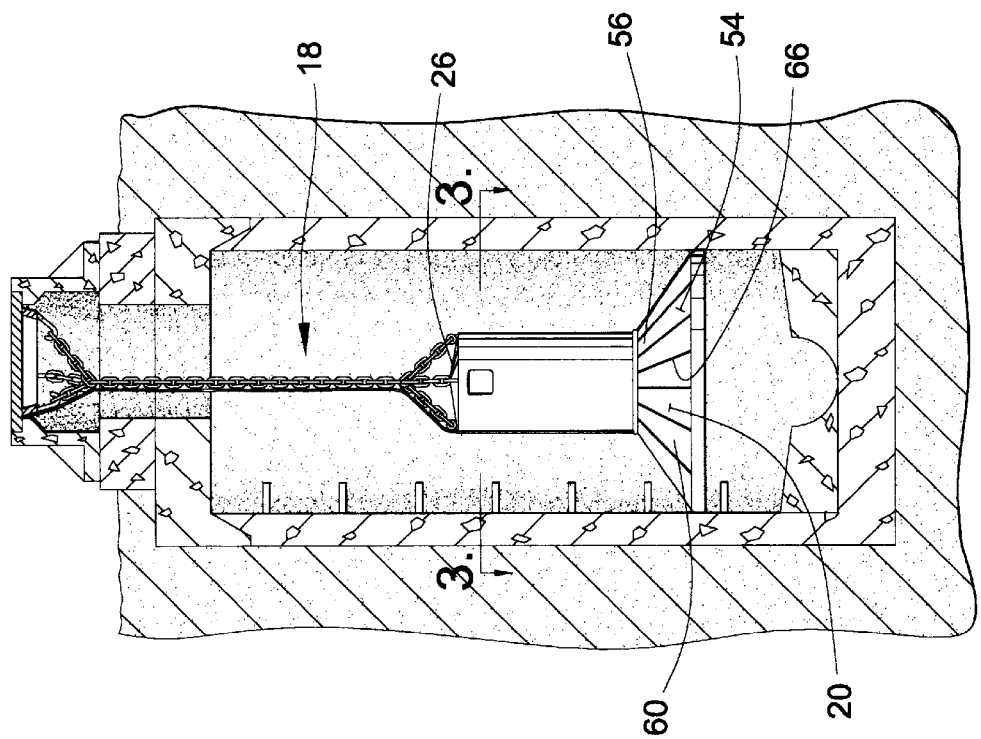
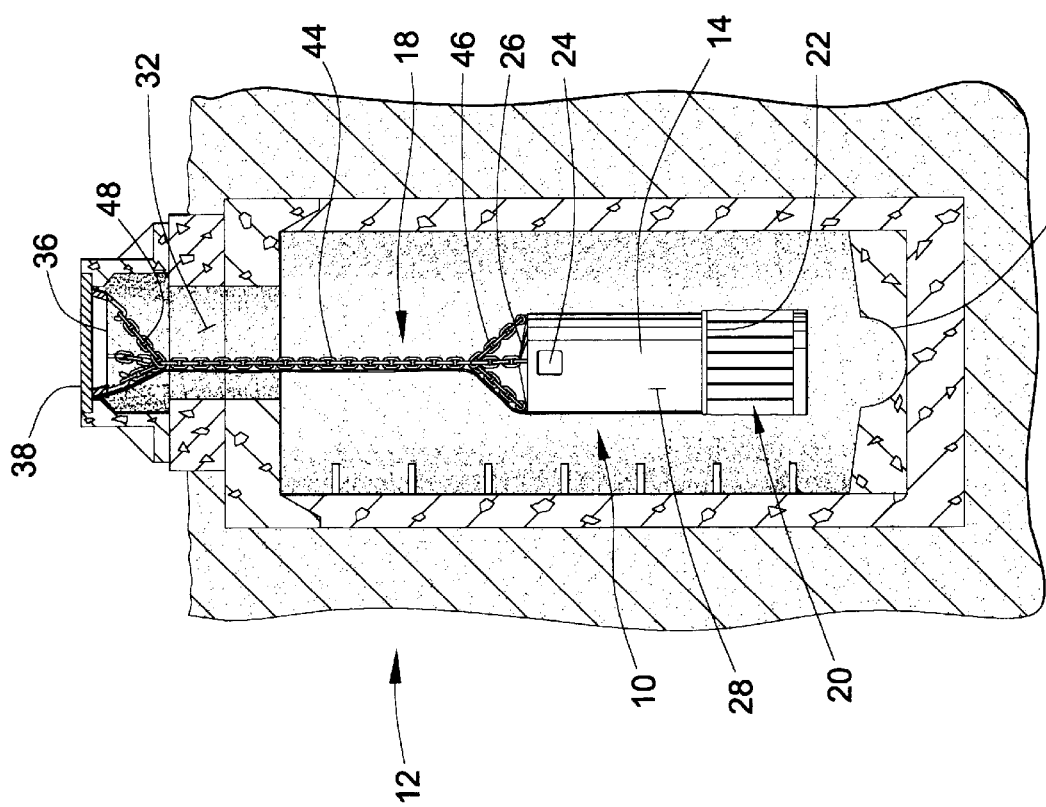

Fig. 3.
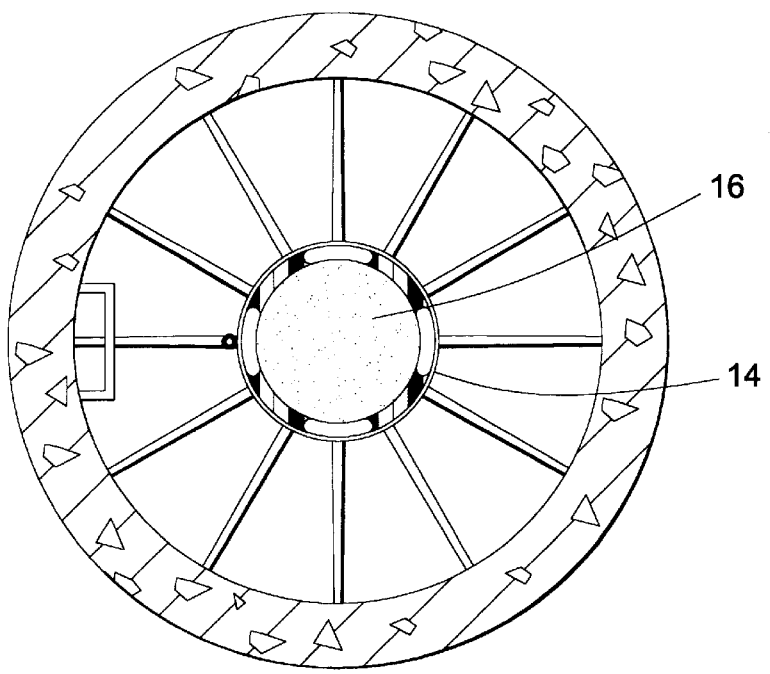
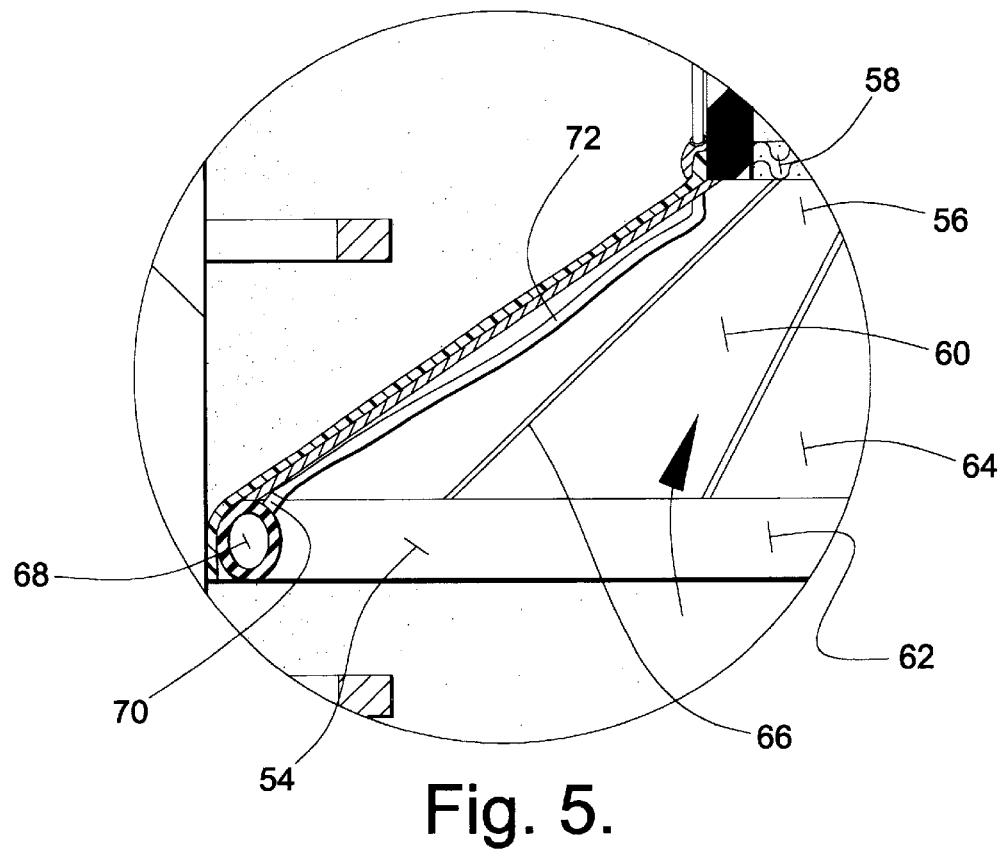
Fig. 5.

DEVICE FOR FILTERING GASES

FIELD OF INVENTION

The present invention relates to a device and method for use in a manhole or similar structure, whereby the device is designed to filter contaminated gases.

BACKGROUND OF INVENTION

Manholes are used to access underground utility and sewage systems with the manhole a conduit to the surface. Often these underground systems will have significant amounts of organic waste, as well as moisture. Such conditions are ideal for the propagation of bacteria. It is known that some species of bacteria found in manholes or sewers will metabolize organic waste. Byproducts of the metabolic process result in the bacteria forming a wide variety of waste compounds. Included among the waste compounds are hydrogen sulfide and other gaseous components, which result in odors emanating from a typical manhole. Additionally, these waste products can cause corrosion of the concrete walls which form the manhole. As such, it is desired to have a method and/or device for eliminating or treating such gases and waste byproducts.

One method for controlling the diffusion of various odiferous gases is to seal the manhole cover to prevent the escape of such sewer or utility gases. Sealing traps the various gases in the manhole. Unfortunately, this allows for the buildup of methane and hydrogen sulfide aggravating corrosion problems and creating a hazardous environment. In response, devices have been developed which allow for the free exchange of gases between the sewer or utility system and the surface. Examples of such devices include breathable manhole lids. Such lids are disadvantageous, however, because they can allow surface water and debris to enter the manhole.

Another alternative is a vented manhole lid which requires an odor control basket or device for filtration be located directly below the lid. These devices and variations thereof have been designed to treat odiferous and contaminated gases found in a sewer or underground utility system. The device includes mechanical valves or traps to allow water or debris entering through the lid to drain down into the sewer or utility pipe section. Typically, the basket is filled with compost or other gas filtration media, with the basket located in the neck of the manhole. These devices are often bolted or attached into the wall of the manhole neck so that only a small space is located between the device and the manhole neck. While useful in treating contaminated gas, such devices, and the odor control media they contain, have been reported to be fouled by surface water and debris entering through the lid. These devices, generally, work well in arid or dry locales, but when substantial rainfall is received, such devices are generally found to be inadequate. It has been observed that during a heavy rain storm, large volumes of water and debris will pass through portions of the manhole lid and into the sewer system. The basket devices or members are in the path of the water and suffer from the media being washed away, or the water ruining the media found in the basket. The loss of media and/or media contamination prevents adequate filtering of contaminated gas by the media. Also, debris caught in the basket interferes with the functioning of the media. As such, these systems are unsuited for use in regions where the rainfall exceeds that found in a desert or semi-arid region. For this reason, it is desired to have a device that can be used to filter gas in regions where there is rainfall exceeding that of an arid region.

Another problem with systems that are located in the neck relates to the corrosive or contaminated gases damaging the majority of the manhole. The gases should be filtered further down in the manhole to circumvent some of the corrosive effects. For this reason, it is desired to have a device that treats the gas prior to contact with most of the manhole. Also, not all the gas is typically treated because some of the gas can pass through the space located between the basket and the manhole neck. For this reason, a device that filters most all of the contaminated gas is desired. As such, it is desired to have a device that can be used in all geographic regions regardless of the amount of rainfall, whereby debris will not be trapped in the manhole neck, and the media will not be washed away or contaminated. Additionally, it is desired to have a device that forces all or the majority of the gas to be filtered by the media.

It should be noted that there is a risk of significant disruption of sealing of the device with the manhole wall as a result of flooding, debris accumulation, or need for personal access. When this happens, the media should be protected from water or debris and not disturbed if the device is removed and reinserted in the manhole.

Other odor control methods involve placement of above ground containers outside of the manhole, either directly on top or adjacent to the manhole. These systems can be used with or without powered movement of the sewer or utility gases from the manhole to the device. However, manholes are often placed in streets or other high traffic areas that do not allow above ground devices.

SUMMARY OF INVENTION

The present invention relates to a device for use in association with a sewer system or any other confined underground area whereby organic waste and moisture collect to produce gas contaminated with sulfur and other compounds. Preferably, the device can be mounted in a manhole or similar narrow tubular structure where gas typically collects or escapes through. The device will include a member for holding an amount of filtration media, whereby the contaminated gas passes through and is filtered by the media found in such member. The member should be of a sufficient size to hold an amount of filtration media sufficient to substantially eliminate contaminates found in the gas. Also, the member should be easily placed in and removed from a manhole or similar structure. Preferably, the member is a canister.

Any of a variety of different types of filtration media can be placed in the canister or similar structure. The media will be selected based on the particular contaminates desired to be removed or filtered. Generally, any of a variety of different medias can be used, including, but not limited to, metal oxides, compost, and activated and impregnated carbon.

The canister will preferably be lowered into the manhole to a position near where the gas emanates from. As such, it is desired to have a support member for use with the device that allows for the easy lowering and removal of the canister into and from the manhole. Typically, a chain or similar cable structure can be used to support the canister. It is preferred if the cable is affixed to a portion of the manhole neck on one end and to the canister on the opposite end.

Attached to the canister or similar member will be a skirt or expandable and collapsible frusta-conical member. The skirt member is desired to direct the contaminated gas to the canister for filtration. Also, the skirt member will form a light seal with the wall of the manhole, or similar structure, whereby gas is generally prohibited from passing along the sides of the skirt member, but the seal is light enough to allow water to pass along the sides. The skirt member should further be of a construction that allows it to fit a variety of diameters so that it is adjustable. Preferably, the skirt member is flexible and has a lip on one end that is inflatable to allow for the expansion of the bottom portion of the skirt to fit the diameter of the structure in which the device is placed.

The present invention is advantageous because it can be located close to the source from which the gases are produced. This, in turn, is advantageous because it helps to eliminate some corrosion and destruction of the manhole or similar structure wall. The device is further advantageous because it is not subject to damage or media malfunction as a result of a rain storm. The device is also advantageous because it can be readily adjusted and easily removed and reset.

BRIEF DESCRIPTION OF THE DRAWINGS

FIG. 1 is a side view of the device for filtering gas, with the device shown in a position prior to use;

FIG. 2 is a side view of the gas filtration device in use in a manhole;

FIG. 3 is a top cutaway view of the device for filtering gas;

DETAILED DESCRIPTION OF THE INVENTION

Figure 4:
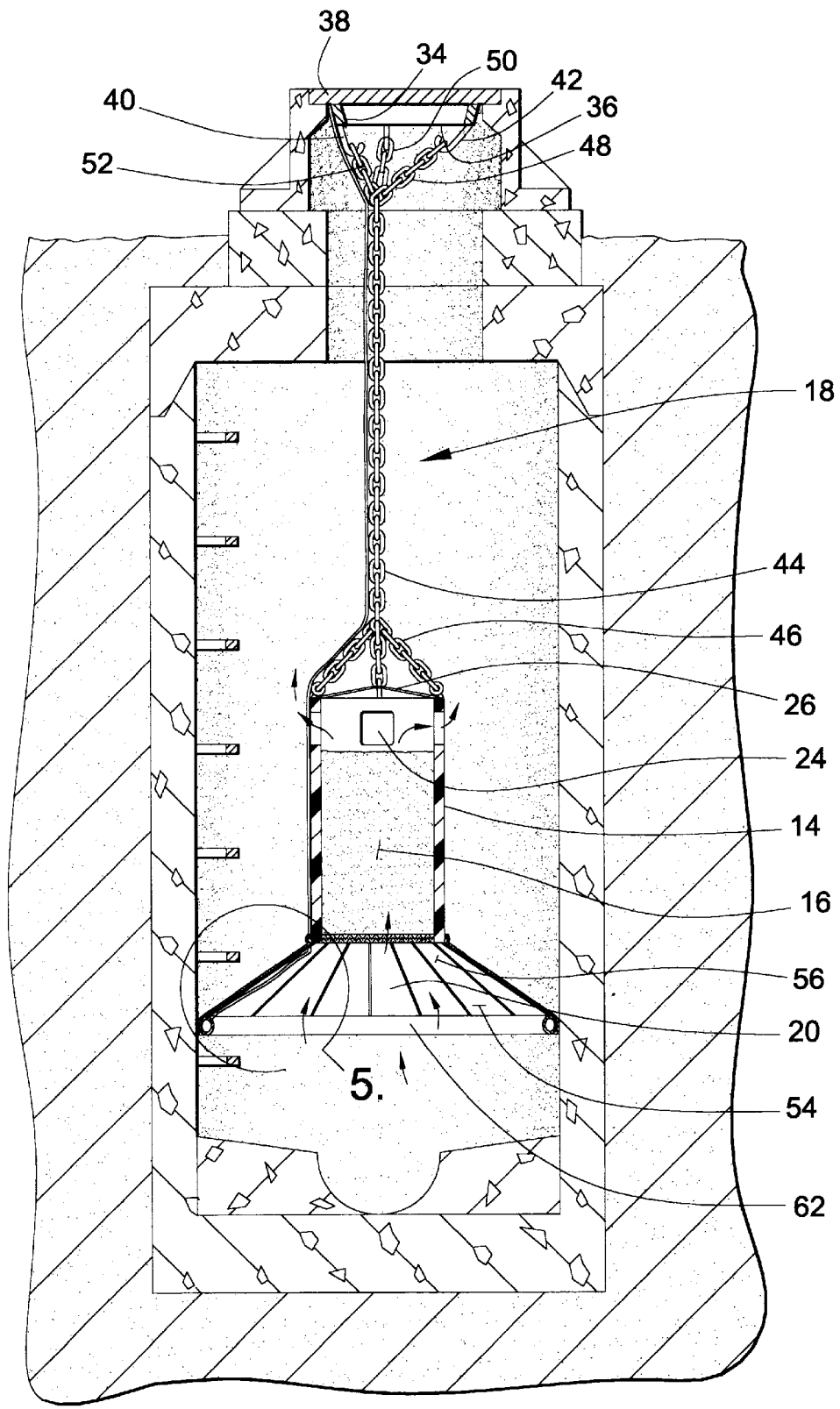
FIG. 4 is a side cut exploded view of the device in use, with the path of the gas illustrated; and, FIG. 5 is an exploded cutaway view of the skirt of the device.

The present invention relates to a device 10 for filtering gas found in a manhole 12 or similar structure. The device is shown in FIGS. 1–5. The present invention also relates to a method for filtering the gas found in the manhole or similar structure. The device 10 will include a canister 14 having an amount of gas filtration media 16, shown in FIGS. 3 and 4, whereby the canister 14 is especially well-suited for treating contaminants that are byproducts of cellular metabolism, including sulfur contaminated gas. Media 16 for gas filtration can also be included to purify contaminants emanating from other sources. The canister 14 has a construction that allows for the free exchange of gas so as to ensure filtration. The device 10 will include a support structure 18 attached to the canister 14, with the support structure 18 designed to hold the canister 14 in position. A skirt device is attached to the canister opposite the support structure 18, with the skirt device 20 designed to direct the contaminated gas into the canister.

The canister 14 is filled with media 16 for filtering contaminated gas, whereby the contaminated gas enters the canister on one end and exits on an opposite end, shown in FIG. 4. The gas that exits has most of the contaminates, that it is desired to eliminate, removed therefrom. The media 16 used to treat the contaminated gas can be selected from any of a variety of constituents, with the chosen media based upon the contaminate desired to be removed from the gas. For example, if it is desired to remove sulfur, then the media can be selected from a compost composition or an activated metal oxide, such as iron oxide. If there is more than one type of contaminate found in the gas, more than one type of media may be selected so as to ensure adequate removal of various contaminates from the gas. As such, the filter media 16 can be selected from the following group: carbon based media, biofilter media, solid metal based media, oxidizing media, and combinations thereof. The solid metal based media can include any metal based composition, such as iron, copper, zinc, or combinations of these metal compounds. The oxidizing media can be a permanganate or a catalytic, activated, impregnated carbon. The biofilter media can include mulch, soil, sand, and any of a variety of other natural compositions. It is further preferred if the media minimizes the force necessary for the sewer gas to pass through it (low pressure drop).

The canister 14 can be of a variety of constructions as long as the gas can readily enter and exit the canister and a sufficient amount of media 16 can be held therein. In particular, the canister 14 must be of a sufficient size to ensure substantial purification of the contaminated gas. Any member or device can be substituted for the canister as long as it can be filled with a quantity of gas filtration media. Preferably, the canister is a cylinder having an opening or openings in the bottom 22, and exit openings 24 located near the top 26. The bottom 22 is preferably a mesh material, or porous material, of a sufficient size to allow air to flow into the canister without allowing the media to wash or dissipate out of the canister. The top 26 of the canister is preferably closed so as to prevent the entry of rain water or other contaminates. For this reason, the exit openings 24 are preferably located on the side 28 of the canister. The exit openings 24 can be any of a variety of dimensions and sizes as long as the purified or treated air can readily exit the canister. Preferably, the canister 14 is manufactured from a corrosion resistant material, with sufficient structural integrity to hold the media. The canister can be made from, for example, reinforced fiberglass, high density polyethylene, high density polypropylene, aluminum, or stainless steel. To adequately hold a sufficient amount of media, the canister should be of a length equal to about 2 feet tall, and should have an outer diameter equal to about 20 inches. Other sizes can be selected as long as the air is sufficiently purified.

The canister 14 is supported and held in place in the manhole 12 or similar structure by a support structure 18. The support structure 18 is intended to elevate the canister proximate to the floor 30 of the manhole, without allowing the canister or device to contact the floor or liquid level. More particularly, it is preferred if the support structure 18 will allow for the canister 14 to be lowered into the manhole 12 so that the canister is not located in the manhole neck 32 and is located closer to the source of the contaminated gas. This is desired to prevent the contaminated gas from contacting the majority of the wall or walls that form the manhole 12. The support structure 18 should be such that the canister can be lowered into the manhole. It is preferred if one end of the support structure can be attached to the lid or neck 32 located near the top of the manhole. Attached to the support structure 18, opposite where it is affixed to the manhole, will be the canister 14. The canister can be attached to the support structure 18 by any of a variety of means.

Preferably, the support structure 18 will include a hanging ring 34, which is a flat, annular ring member designed to fit between the lip 36 of the manhole 12 and the manhole lid 38. The lip 36 is the portion of the manhole 12 on which the lid 38 rests. The ring member 34 will rest on the lip, with the manhole lid placed over the ring. The annular hanging ring 34 will have an outer diameter of about 23.5 inches and an inner diameter of about 22 inches. The diameter of the ring 34 will vary according to the diameter of the manhole neck 32. The thickness of the hanging ring 34 is preferably about 0.25 inches thick. Attached to the inner diameter of the ring 34 will be at least one hook 40 which will extend away and downward from the hanging ring. Preferably, the hook 40 or hooks 40 and 42 will extend approximately 3 inches to 5 inches down and away from the hanging ring 34. The hook 40 or hooks 42 are used to attach and center the hanging chain 44 or wire suspending the canister 14 located in the manhole 12. While the hanging ring 34 and hooks 40 and 42 are preferred, any of a variety of devices or members can be used to hold the chain 44 or similar device used to elevate, hold, and center the canister 14. An alternative involves affixing hooks to the wall of the manhole neck 32 and attaching the chain or wire. Yet another alternative would involve hooks having a flat portion that can be affixed to the manhole lip 36. As such, any system can be used as long as the canister 14 is suspended and, preferably, centered.

The support structure 18 will generally include a hanging chain 44, cable, or similar member which can be affixed on one end 46 to the canister 14 and held on an opposite end 48 by the hook 40 or hooks 42. A chain 44 or similar load bearing line member is selected because it can typically hold a device that weighs 100 pounds or greater and is of a construction ideally suited for use in a manhole. Further, the chain can be used to easily adjust and remove the device in and from the manhole. The chain will be fastened to the top or lid 26 of the canister. Additional chains 50 and 52 may be used to pull the hanging chain 44 toward the middle to thereby center the canister. In order to ensure that the canister is substantially centered in the manhole, a second 50, and possibly a third 52 chain may be used, whereby the chain or chains are attached on one end to a hook and on an opposite end to the chain affixed to the canister. The smaller chain or chains will be used to center the canister. The hanging chain is used to vertically position the apparatus to the desired depth.

Attached to the canister 14 opposite the support structure 18 will be a skirt structure 20. When in use, the skirt structure 20 will have a frusta-conical construction, with the wide portion 54 located opposite the canister, and the narrow portion 56 proximal to the canister. The skirt structure 20 is designed to direct the contaminated gas to pass through the canister. Further, the skirt structure is designed to allow water and other debris to pass to the bottom of the manhole without becoming lodged on the device. The skirt device 20 is of an adjustable diameter to fit manholes of a variety of different dimensions. While the frusta-conical shape is desired, the skirt structure can have any of a variety of constructions as long as contaminated gas is directed to the filtration media 16. The construction must be such that the contaminated gas is directed to pass through the filter or canister 14 and a light seal is formed between the skirt 20 and the manhole wall. The seal should be sufficient to prevent the passage of gas and to allow water to pass to the bottom. Thus, the skirt 20 will preferably have a downward sloping (water and debris shedding to the manhole wall) design with the skirt angled downward from the treatment canister to the manhole wall. Also, the skirt should be sufficiently flexible enough to allow water and smaller debris to pass between the edge of the skirt and the manhole wall, with the skirt returning to a lightly sealed condition after the water passage that minimizes untreated sewer gas leakage around the edges.

Preferably, the skirt structure 20 has a ring, or attachment member 58 which will be affixed near the bottom of the canister 14. The attachment member 58 is designed to hold the skirt 20 in contact with the canister. Preferably, the attachment member 58 is a semi-rigid annular ring or similar device affixed to the canister. Alternatively, the attachment member can be a device whereby the canister is attached directly to the skirt or is attached by a flexible member that forms a duct hole and extends from the canister to the skirt.

Skirting 60 made of a flexible material is attached on one end 56 to the attachment member 58 and on an opposite end 54 to an expandable ring member 62, shown best in FIG. 5. Once attached to the canister and in use, the skirt will be of a substantially frusta-conical shape, with the narrow portion 56 attached or proximal to the canister 14. Thus, the skirt 20 has a narrow diameter at the point where it is affixed to the canister and a larger diameter at the end 54 opposite the canister. The skirt will have an inner face and an outer face 64. The skirt 20 should be replaceable and will be attached to the bottom of the device. The skirt is sized to fit a variety of sizes or shapes, or standard manhole diameters of 36, 48, 60, 72, 84, and 96 inches, once inflated or extended. When being lowered into the manhole, the replaceable, flexible attached skirt will be uninflated, as shown in FIG. 1, or not extended, and of a sufficient size to allow insertion into a manhole opening of 20 inches or larger.

The skirting 60 can be made from any of a variety of flexible vapor resistant materials including polyvinyl chloride, polyethylene, high density polyethylene, polypropylene, and any other material resistant to gases typically encountered in a manhole. The skirting can have a thickness of between 4 millimeters (mm) and 30 mm. Other dimensions may be used as long as the skirt is flexible and does not allow gas to pass therethrough.

It is preferred if the skirt has a plurality of affixed ribs, exemplified by 66. The ribs are affixed to the attachment member 58 and to the expandable ring 62, with the ribs emanating outward from the inner diameter 56 of the skirt. Further, it is preferred for the skirt to be attached to the ribs. The ribs are preferably inside the skirt, although they can be placed outside of the skirt. The ribs can be attached by gluing, hot air welding, or sewing into a pocket. The ribs are essentially perpendicular to the skirt edges. The ribs provide support for the skirt so that when in use, sagging of the skirt is substantially precluded to prevent the pooling of water on the surface of the skirt. The ribs can be made of any corrosion resistant material such as rigid PVC or plastic, or metals, such as aluminum or stainless steel. It is preferred if the ribs are located about every 3 inches to 4 inches around the circumference of the canister.

The expandable ring 62 can be inflated to cause the diameter of the outer edge 54 portion of the skirt structure to increase. The ring 62 can also be deflated to cause the diameter to contract and allow for easy movement of the skirt. As such, when the lip 62 is inflated, the diameter of the skirt will inflate to a point whereby the expandable ring is in continuous contact with the manhole walls. An inflatable ring or lip 62 is desired because the diameter of the skirt can be increased to form a light seal with the manhole walls. Such a seal is necessary to allow the passage of water but prevent the escape of contaminated gas. The lip 62 can be made of any of a variety of flexible, expandable materials, such as rubber, PVC, or other flexible vapor tight material. Additionally, the lip will include an inner tube 68, or similar member, whereby a fluid from the surface can be used to inflate the lip. Such fluids can include water or air. Attached to the lip 62 and, in particular, the tube 68, will be a valve 70. The valve 70 is attached to an inflation tube 72 which extends to the surface. Thus, the lip can be inflated to lightly seal the skirt on the manhole wall without interference from ladder rungs commonly installed on the manhole wall. The skirt can also be uninflated to a sufficiently small size for device removal, odor control media replacement, or cleaning, when necessary. In addition, the device can be reinserted and inflated or extended multiple times without damage to the device or significant loss of light sealing between the skirt edge and the manhole wall.

In an alternative construction, springs can be used instead of the lip to expand the diameter of the skirt. The springs would preferably be located near the canister and would be affixed to the ribs so that when actuated, the ribs extend outward and increase the diameter of the skirt.

Thus, there has been shown and described a device and method for filtering gas found in a manhole or similar structure which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

What is claimed is:

1. A method for filtering gas in a manhole comprising:
    (a) affixing a support structure to a portion of a manhole neck and on an opposite end to a canister containing gas filtration media;
    (b) lowering said canister containing said gas filtration media into the manhole, to a position near the manhole's base;
    (c) inflating a ring attached to a skirt which is attached on an opposite end to said canister, whereby inflating said ring will result in said skirt having a frustaconical shape and will form a light seal with the manhole wall, whereby gas will be forced to pass through said canister.

2. A gas filter for use in a manhole comprising:
    (a) a gas filter canister having a bottom, at least one side wall, and an enclosed top, said canister containing an amount of filtration media, said bottom having at least one opening designed to allow contaminated gas to enter said canister, and vents located proximal to said canister top and in said side wall;
    (b) a support structure attached on one end to said canister and on an opposite end to a portion of the manhole located near the surface; and,
    (c) a skirt member attached to said canister, with said skirt having opposed ends, whereby one opposed end has a fixed diameter and one opposed end has an adjustable diameter.

3. The device of claim 2 wherein said canister is a cylinder having a mesh bottom and made of a corrosion resistant material.

4. The device of claim 2 wherein said media is selected from the group consisting of: carbon based media, bio-filter media, solid metal based media, oxidizing media, and combinations thereof.

5. The device of claim 2 wherein said support structure comprises a device for attachment to a manhole neck and a hanging line.

6. The device of claim 2 wherein said skirt member comprises:
    (a) a ring fastened to said canister, with said ring designed to hold said skirt in contact with said canister;
    (b) a plurality of ribs having opposed ends, said ribs attached on one end to said ring;
    (c) a lip attached to said ribs opposite said ring; and,
    (d) a flexible material attached to said lip and said ring, with said ribs supporting said material and forming said skirt.

7. The device of claim 6 wherein said lip is an inflatable tube, whereby when inflated, said lip causes an increase in diameter of said opposed end of said skirt.

8. The device of claim 7 wherein said tube includes a stem attached to a hose, said hose designed to allow inflation of said lip.

9. The device of claim 6 wherein said skirt member includes a spring mechanism located near said ring, whereby when said spring mechanism is activated, the diameter of said adjustable end is increased.

* * * * *